US012073785B2

(12) United States Patent
Jun

(10) Patent No.: US 12,073,785 B2
(45) Date of Patent: Aug. 27, 2024

(54) IR DROP COMPENSATION APPARATUS AND METHOD FOR DISPLAY PANEL AND DISPLAY DRIVING APPARATUS

(71) Applicant: LX Semicon Co., Ltd., Daejeon (KR)

(72) Inventor: Young Jun Jun, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 38 days.

(21) Appl. No.: 17/952,904

(22) Filed: Sep. 26, 2022

(65) Prior Publication Data

US 2023/0139387 A1 May 4, 2023

(30) Foreign Application Priority Data

Nov. 4, 2021 (KR) ........................ 10-2021-0150284

(51) Int. Cl.
*G09G 3/3233* (2016.01)
*G09G 3/3291* (2016.01)

(52) U.S. Cl.
CPC ......... *G09G 3/3233* (2013.01); *G09G 3/3291* (2013.01); *G09G 2320/0233* (2013.01)

(58) Field of Classification Search
CPC ...... G09G 3/20; G09G 3/2092; G09G 3/3208; G09G 3/3233; G09G 3/3258; G09G 3/3291; G09G 5/02; G09G 5/10; G09G 2320/0223; G09G 2320/0233; G09G 2320/0271; G09G 2320/029; G09G 2320/0626; G09G 2360/141; G09G 2360/16
See application file for complete search history.

(56) References Cited

U.S. PATENT DOCUMENTS

2020/0143750 A1* 5/2020 Gao .................... H10K 59/121
2022/0208044 A1* 6/2022 Lee ...................... G09G 3/3258

FOREIGN PATENT DOCUMENTS

KR 2011-0123952 A 11/2011
KR 2015-0082514 A 7/2015
KR 20170023614 A * 3/2017
KR 2017-0121774 A 11/2017
KR 20200078167 A * 7/2020

* cited by examiner

*Primary Examiner* — Stacy Khoo
(74) *Attorney, Agent, or Firm* — POLSINELLI PC

(57) ABSTRACT

The present disclosure discloses an IR drop compensation apparatus and method for a display panel and a display driving apparatus having an IR drop compensation function. The IR drop compensation apparatus may be configured to generate an IR drop weight based on a brightness value obtained by measuring brightness of a display panel and to adaptively adjust the IR drop weight.

19 Claims, 6 Drawing Sheets

IR DROP COMPENSATION APPARATUS AND METHOD FOR DISPLAY PANEL AND DISPLAY DRIVING APPARATUS

BACKGROUND

1. Technical Field

The present disclosure relates to an IR drop compensation for a display panel, and more particularly, to an IR drop compensation apparatus and method for a display panel and a display driving apparatus having an IR drop compensation function.

2. Related Art

A display panel includes many pixels in order to display a screen. The pixels may be configured using OLED elements, for example. All the pixels may be disposed as a matrix structure, for example.

Display data for displaying a screen is converted into an analog display signal in a display driving apparatus. The display driving apparatus is disposed on one side of the display panel and configured to provide display signals through display signal lines of the display panel. The display signal lines correspond to columns in the matrix structure. The pixels may receive the display signal provided through corresponding display signal lines.

In an ideal case, the pixels need to receive display signals corresponding to the same gray at the same level regardless of their locations in the display panel. Furthermore, when display signals corresponding to the same gray are provided to all the pixels, all the pixels need to emit light with the same brightness.

However, when the pixel is located at a longer distance where the display signal is transferred through the display signal lines, the display signal may be provided at a level lowered by the distance due to an IR drop. The IR drop may be expressed as a voltage drop. For this reason, when the display signals corresponding to the same gray are provided to all the pixels, each of the pixels may emit light with relatively lower brightness due to an IR drop based on a longer distance from the display driving apparatus.

That is, if the display signals corresponding to the same gray are provided to all the pixels, there may occur a phenomenon in which pixels close to the display driving apparatus emit light with relatively high brightness and pixels farther from the display driving apparatus emit light with gradually low brightness. As the gray becomes higher, a brightness deviation attributable to an IR drop may become greater.

Accordingly, a technology capable of compensating for the IR drop needs to be applied to an apparatus for a display.

SUMMARY

Various embodiments are directed to providing an IR drop compensation apparatus and method for a display panel, which can compensate for a phenomenon in which a display signal having a different level is provided to each location of a display panel due to an IR drop, thereby displaying a high quality screen on the display panel.

Various embodiments are directed to providing a display driving apparatus having an IR drop compensation function, which can compensate for a phenomenon in which a display signal is differently applied for each location of a pixel due to an IR drop.

Various embodiments are directed to compensating for a case where a display signal is differently applied for each location of a pixel due to an IR drop, by using a compensation weight generated by performing an operation on an adaptive control value having additional information, and an IR drop weight for compensating for brightness values of pixels.

Various embodiments are directed to compensating for brightness values of pixels through control of an IR drop weight by using at least one of average pixel luminance and a display brightness value as the additional information.

In an embodiment, an IR drop compensation apparatus for a display panel may include a brightness measuring unit configured to measure brightness of a display panel and to provide brightness values for all pixels, an IR drop weight generation unit configured to generate an IR drop weight for compensating for the brightness values for each of pluralities of pre-designated locations, and an adaptive controller configured to provide an adaptive control value for each location for controlling the brightness value for each location and to generate a compensation weight by performing an operation on the IR drop weight and the adaptive control value for each location.

Furthermore, in an embodiment, an IR drop compensation method for a display panel may include providing brightness values for all pixels of a display panel measured by using a brightness measuring unit, generating an IR drop weight for compensating for the brightness values for each of pluralities of pre-designated locations, providing an adaptive control value for controlling the brightness value for each location, and generating a compensation weight by performing an operation on the IR drop weight and the adaptive control value for each location.

Furthermore, in an embodiment, a display driving apparatus having an IR drop compensation function may include a compensation information storage unit configured to store a compensation weight generated by performing an operation on an IR drop weight and an adaptive control value for each of a plurality of pre-designated locations of a display panel, and a compensation unit configured to receive display data and the compensation weight, perform compensations on the display data, displayed on the display panel, by using a weight generated by interpolation using the compensation weights for a plurality of locations adjacent to a display location of the display data, and output the compensated display data.

The present disclosure has an effect in that it can remove a brightness difference between pixels, attributable to an IR drop that differently acts depending on locations of the pixels, through compensations for display data using an IR drop weight, which makes it possible to display, on the display panel, a high quality screen from which the influence of an IR drop has been removed.

Furthermore, the present disclosure has an effect in that it can perform compensations on display data suitably for luminance by adaptively adjusting the IR drop weight by using at least one of average pixel luminance and a display brightness value.

DETAILED DESCRIPTION

The present disclosure discloses an IR drop compensation apparatus and method for a display panel. Furthermore, the present disclosure discloses a display driving apparatus having an IR drop compensation function by using a compensation weight generated by the IR drop compensation apparatus and method.

Figure 1:
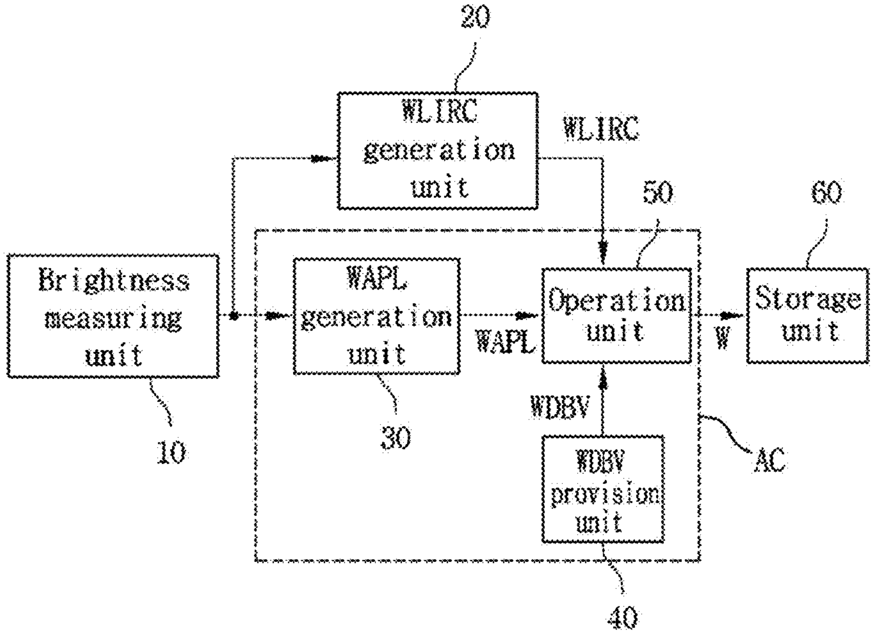
FIG. 1 is a block diagram for describing an IR drop compensation apparatus and method for a display panel according to the present disclosure.

First, the IR drop compensation apparatus for a display panel may be implemented as in FIG. 1. The IR drop compensation method may be implemented by the embodiment of FIG. 1.

Referring to FIG. 1, the IR drop compensation apparatus may include a brightness measuring unit 10, an IR drop weight generation unit 20, an adaptive controller (AC) and a storage unit 60. The IR drop weight generation unit 20 is hereinafter called a WLIRC generation unit 20.

First, the brightness measuring unit 10 is configured to measure brightness of a display panel (100 in FIG. 2) and to provide brightness values for all pixels.

The display panel is configured to receive a display signal for indicating a gray preset for measurement.

In an ideal case, all the pixels of the display panel emit light in a way to have a corresponding gray with the same brightness value.

Figure 2:
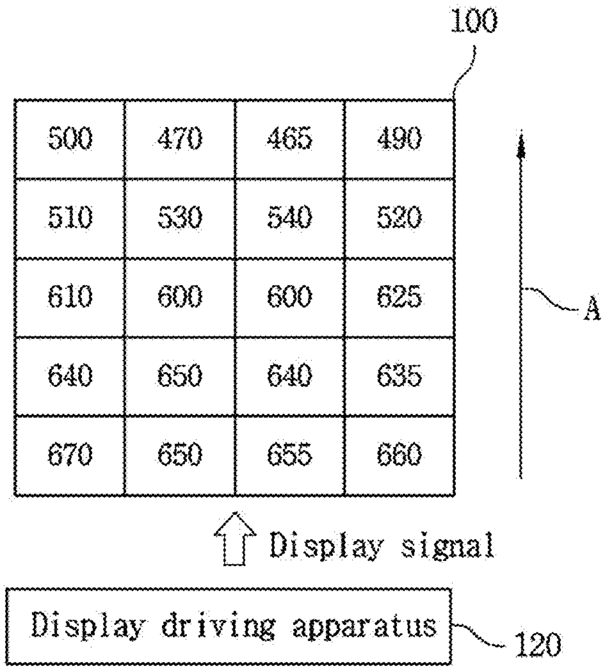
FIG. 2 is a diagram for describing that brightness of pixels varies depending on locations of the pixels in a display panel.

The display signal is provided by a display driving apparatus (120 in FIG. 2). The display driving apparatus converts, into an analog display signal, display data provided by a timing controller (140 in FIG. 8).

The display signal may be provided through one side of the display panel, and may be transferred to the pixels through display signal lines in the display panel.

In such an environment, an IR drop may act on the display signal due to an impedance element formed between one side of the display panel and each of the pixels. The impedance element may include resistance values of the display signal lines having different distances in which the display signal is transferred. The resistance values may vary depending on locations of the pixels.

The IR drop may greatly act on the display signal with respect to a pixel at a longer distance at which the display signal is transferred. Accordingly, the display signal may be provided to each pixel as the display signal having a level lowered by the corresponding distance due to the IR drop.

FIG. 2 illustrates brightness of pixels at respective locations. It may be understood that each region of the display panel 100 means a pixel. It may be understood that a number in each region means a brightness value.

It may be understood that when display signals having the same gray are applied from the display driving apparatus 120 to the display panel 100, the pixels have respective brightness values each lowered by the display signal having a level lowered by a longer distance at which the display signal is transferred. That is, it may be seen that brightness values of the pixels are gradually lowered in the direction of an arrow A in FIG. 2.

The brightness measuring unit 10 may measure brightness of pixels having a difference in response to the display signal having the same gray, and may provide brightness values for all the pixels.

For example, when mura occurs due to degraded pixels of the pixels of the display panel, a screen on the display panel may be photographed for de-mura, and information for the de-mura may be extracted as the photographed image.

The photographed image may have a different brightness value depending on the photographing timing. For example, photographed images before and after the aging of the display panel may have different brightness values. Furthermore, a separate data processing process is necessary to extract information for de-mura from the photographed images.

Accordingly, to generate a compensation weight for compensating for an IR drop by using a photographed image makes it difficult to secure an accurate brightness value and requires an additional data processing process.

Accordingly, the present disclosure is configured to secure brightness values of the pixels of the display panel measured by the brightness measuring unit 10 without using a photographed image of the display panel. Accordingly, the present disclosure can generate a required compensation weight by using accurate brightness values without an additional data processing process.

The WLIRC generation unit 20 receives brightness values of pixels of the display panel 100 measured by the brightness measuring unit 10, selects a brightness value for each of pluralities of pre-designated locations, and generates an IR drop weight WLIRC for compensating for brightness values of selected locations.

Figure 3:
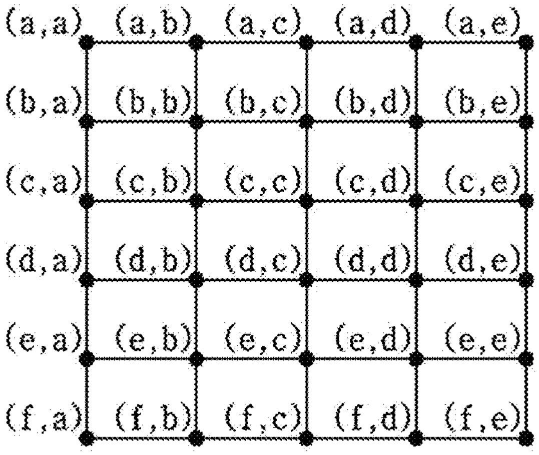
FIG. 3 is a diagram for describing an IR drop weight for each location.

To this end, the WLIRC generation unit 20 may select locations where brightness values will be selected as in FIG. 3. In FIG. 3, (a,a) to (f,e) may be understood as locations of pixels where brightness values will be selected, that is, coordinates.

In an embodiment of the present disclosure, the IR drop weight WLIRC may be generated for each location in FIG. 3, and a compensation weight W generated by adaptively controlling the IR drop weight WLIRC may be generated.

Figure 4:
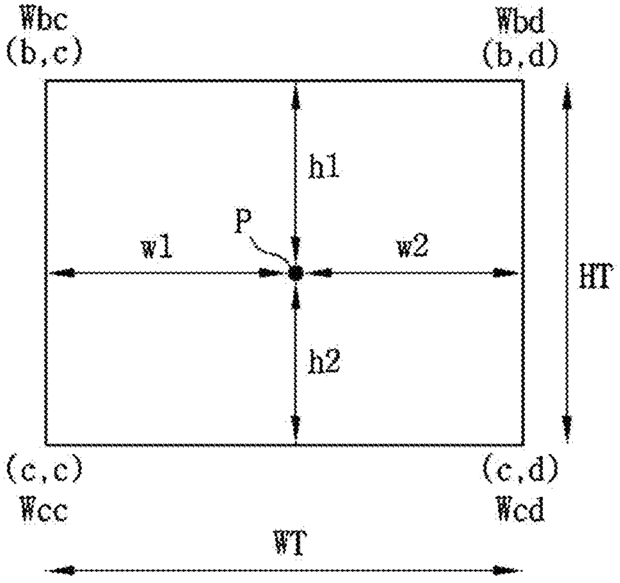
FIG. 4 is a diagram for describing interpolation using an IR drop weight for each location.

Referring to FIG. 4, for example, a compensation weight of the location (b,c) is indicated as Wbc. A compensation weight of the location (b,d) is indicated as Wbd. A compensation weight of the location (c,c) is indicated as Wcc. A compensation weight of the location (c,d) is indicated as Wcd.

For example, a compensation weight Wp of a location P may be calculated by an operation using compensation weights of adjacent selected locations, that is, the compensation weight Wbc of the location (b,c), the compensation weight Wbd of the location (b,d), the compensation weight Wcc of the location (c,c) and the compensation weight Wcd of the location (c,d). That is, the compensation weight Wp of the location P may be calculated as in Equation 1 below, for example.

$$Wp = \frac{Wbc \times w1 \times h1 + Wbd \times w2 \times h1 + Wcc \times w1 \times h2 + Wcd \times w2 \times h2}{WT \times HT} \quad \text{[Equation 1]}$$

In Equation 1, Wp is the compensation weight of the location P. WT is a width between selected pixels, and corresponds to an interval between the location (c,c) and the location (c,d), for example. HT is a height between selected pixels and corresponds to an interval between the location (b,d) and the location (c,d), for example. w1 corresponds to a horizontal distance between the location (b,c) and the location P. w2 corresponds to a horizontal distance between the location P and the location (b,d). h1 corresponds to a vertical height between the location (b,c) and the location P, that is, a vertical interval. h2 corresponds to a vertical height between the location P and the location (c,c), that is, a vertical interval.

The WLIRC generation unit 20 may generate the IR drop weight WLIRC based on the lowest brightness value among selected brightness values.

More specifically, the WLIRC generation unit 20 may select a brightness value for each of pluralities of pre-designated locations as in FIG. 3, among brightness values of pixels measured by the brightness measuring unit 10, and may generate an IR drop weight WLIRC based on the lowest brightness value of the selected brightness values. In this case, the lowest brightness value may be defined as a reference brightness value. That is, the IR drop weight WLIRC may be set to have a value, which may be converted into the reference brightness value, through an operation the IR drop weight WLIRC and a brightness value of a corresponding pixel. Multiplication may be applied as the operation.

As a result, the WLIRC generation unit 20 may lower, to the reference brightness value, a brightness value for each location, which is higher than the reference brightness value.

The pixels may be divided into pixels for representing red, green and blue.

The WLIRC generation unit 20 may divide a mode into a white mode in which a brightness difference between the colors is not taken into consideration and a color mode in which a brightness difference between the colors is taken into consideration, and may generate the IR drop weight WLIRC for each mode.

To this end, the WLIRC generation unit 20 may have a white mode value for the white mode and color mode values for the color mode. The color mode values may be different for red, green and blue.

In the white mode, the WLIRC generation unit 20 may generate the IR drop weight WLIRC by applying the same white mode value to all the pixels. In this case, the WLIRC generation unit 20 may generate a weight for compensating for brightness values of selected locations based on the lowest brightness value, may generate the IR drop weight WLIRC by performing an operation on the weight and the white mode value, and may output the IR drop weight WLIRC. Multiplication may be used in the operation of the white mode value and the weight.

Furthermore, in the color mode, the WLIRC generation unit 20 may divide the pixels for each color, and may generate the IR drop weight WLIRC by applying, to pixels, a color mode value corresponding to a color. In this case, the WLIRC generation unit 20 may generate a weight for compensating for brightness values of selected locations based on the lowest brightness value, may generate the IR drop weight WLIRC by performing an operation on the weight and the color mode value, and may output the IR drop weight WLIRC. Multiplication may be used in the operation of the color mode value and the weight.

The adaptive controller (AC) may provide an adaptive control value for each location for controlling a brightness value for each location, and may generate a compensation weight W by performing an operation on the IR drop weight WLIRC and the adaptive control value for each location.

To this end, the adaptive controller (AC) is configured to include an average pixel luminance weight generation unit 30, a display brightness value weight provision unit 40 and an operation unit 50. The average pixel luminance weight generation unit 30 is hereinafter called a "WAPL generation unit 30", and the display brightness value weight provision unit 40 is hereinafter called a "WDBV provision unit 40."

In an embodiment of the present disclosure, an average pixel luminance weight WAPL may be used as an adaptive control value. In another embodiment, a value generated by performing an operation on the average pixel luminance weight WAPL and a display brightness value weight WDBV may be used an adaptive control value. In this case, multiplication may be used as the operation.

First, the WAPL generation unit 30 is configured to generate the average pixel luminance weight WAPL for compensating for average pixel luminance (hereinafter called "APL") by using brightness values for respective locations.

Brightness of a screen is lowered as APL is decreased, and an IR drop of a corresponding display signal is also reduced. In contrast, brightness of a screen is raised as APL is increased, and an IR drop of a corresponding display signal is also increased. Accordingly, it is necessary to decrease a weight when APL is low and to increase a weight when APL is high.

In this case, APL of a selected location may be understood as an average of pieces of pixel luminance in a preset given region including the selected location. That is, the APL may be illustrated as corresponding to an average of brightness values of pixels included in the given region.

Figure 5:
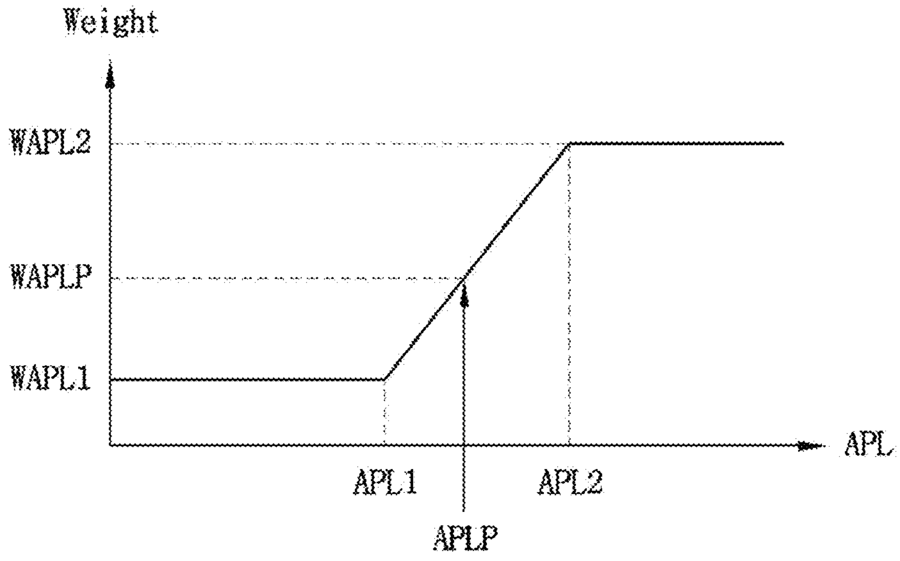
FIG. 5 is a graph for describing that an average pixel luminance weight is set based on average pixel luminance.

Furthermore, a range of APL may be set based on a distribution of brightness values of pixels as in FIG. 5. A range of a weight may be set in accordance with the range of the APL.

For example, the WAPL generation unit 30 may divide a range of APL into a plurality of subranges, and may set an average pixel luminance weight WAPL having a different value for each subrange.

Referring to FIG. 5, the WAPL generation unit 30 may divide a range of average pixel luminance into a first subrange, a second subrange and a third subrange by using a first luminance reference value APL1 and a second luminance reference value APL2. The second luminance reference value APL2 may be set to have a higher luminance value than the first luminance reference value APL1.

The first subrange may be set to be equal to or lower than the first luminance reference value APL1. The WAPL generation unit 30 may be set to use, as an average pixel luminance weight WAPL, a first average pixel luminance weight WAPL1 pre-designated with respect to APL in the first subrange.

The second subrange may be set to be equal to or higher than the second luminance reference value APL2. The WAPL generation unit 30 may be set to use, as an average pixel luminance weight WAPL, a second average pixel luminance weight WAPL2 which is pre-designated and higher than the first average pixel luminance weight WAPL1 with respect to APL in the second subrange.

The third subrange may be set between the first luminance reference value APL1 and the second luminance reference value APL2. The WAPL generation unit 30 may be set to use, as an average pixel luminance weight WAPL, a value proportional to an increase in APL in the third subrange. For example, an average pixel luminance weight WAPLP may be used as the average pixel luminance weight WAPL in accordance with specific average pixel luminance APLP of the third subrange.

For example, in the third subrange, the average pixel luminance weight WAPL may have a value increasing $2^n$ times proportional to an increase in APL. In this case, n is a natural number equal to or greater than 1.

The operation unit 50 may use an average pixel luminance weight WAPL as an adaptive control value, and may generate a compensation weight W by performing an operation on an adaptive control value and an IR drop weight WLIRC for each location.

As described above, the present disclosure may be implemented to use, as an adaptive control value, a value generated by performing an operation on the average pixel luminance weight WAPL and the display brightness value weight WDBV.

To this end, the WDBV provision unit 40 may be configured. The WDBV provision unit 40 may be configured to provide the display brightness value weight WDBV.

A display brightness value (hereinafter called a "DBV") may be understood as a value that controls a brightness value of the display panel so that the brightness value is equally increased or decreased with respect to all the pixels. That is, it may be understood that a gray range shifts in response to a change in the DBV.

An IR drop is increased as the DBV becomes high and is reduced as the DBV becomes low. Accordingly, when the DBV is high, it is necessary to increase the display brightness value weight WDBV. When the DBV is low, it is necessary to reduce the display brightness value weight WDBV. That is, it is necessary to adaptively adjust the IR drop weight WLIRC in response to a change in the DBV.

Figure 6:
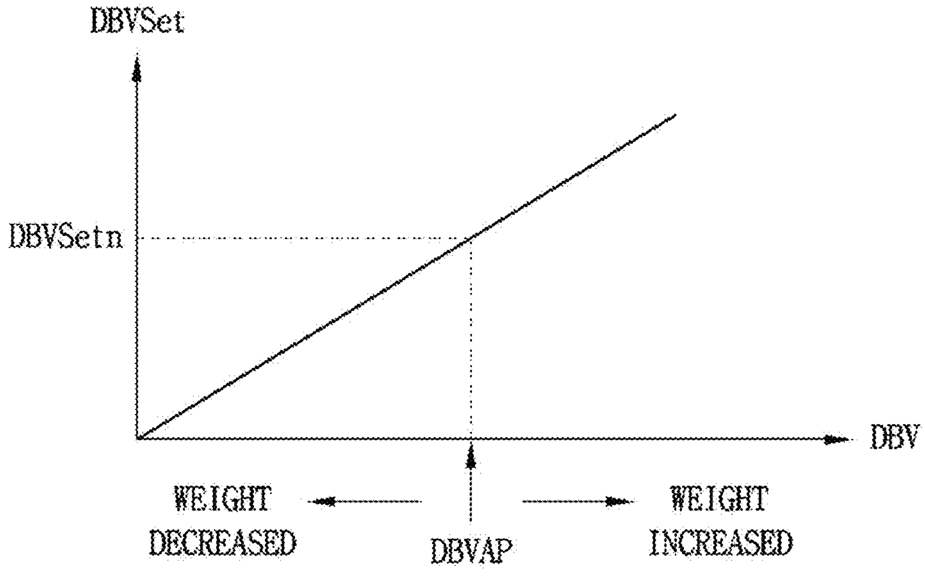
FIG. 6 is a graph for describing that a display brightness value weight set is selected based on a display brightness value.

The WDBV provision unit 40 may have a display brightness value weight set DBVSet which may be set in accordance with a range in which a DBV varies as in FIG. 6.

A display brightness reference value DBVAP is preset for each display panel 100. The display brightness reference value DBVAP may be provided by an application processor within the display apparatus or given storage means.

The WDBV provision unit 40 may select a display brightness value weight set DBVSet based on a display brightness reference value DBVAP provided as described above. The display brightness value weight set DBVSet may include a plurality of display brightness value weights WDBV having different values for each of a plurality of regions of the display panel 100, which is divided in units of a plurality of horizontal lines as in FIG. 7.

Figure 7:
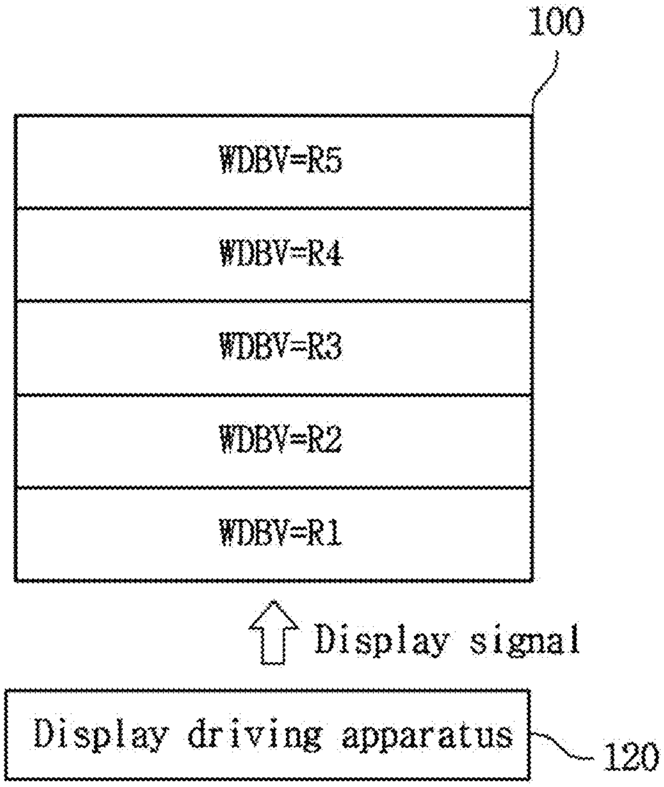
FIG. 7 is a diagram for describing that a display brightness value weight is differently set for each location of a display panel.

Referring to FIG. 7, the display panel 100 is divided into the plurality of regions including the plurality of horizontal lines. The display brightness value weights WDBV may be differently set for the respective regions. The display brightness value weights WDBV may be differently set by taking into consideration brightness values different for each region due to an IR drop. FIG. 7 illustrates that display brightness value weights WDBV are differently set like R1 to R5 for each region.

A larger number of regions to which the display brightness value weights WDBV are applied are preferred, but the number of regions may be set by taking into consideration the size of the display driving apparatus 120 fabricated as a chip.

Through the construction of the WDBV provision unit 40, the operation unit 50 may use, as an adaptive control value, a value generated by performing an operation on the display brightness value weight WDBV and the average pixel luminance weight WAPL for each location, and may generate the compensation weight W by performing an operation on the adaptive control value and the IR drop weight WLIRC for each location.

As described above, the IR drop compensation apparatus for a display panel according to the present disclosure may generate the compensation weight W by performing an IR drop compensation method.

More specifically, the IR drop compensation method may include steps of providing brightness values for all the pixels of the display panel 100 measured by using the brightness measuring unit 10, generating the IR drop weight WLIRC for compensating for brightness values for each of pluralities of pre-designated locations, providing an adaptive control value for controlling the brightness value for each location, and generating the compensation weight W by performing an operation on the IR drop weight WLIRC and the adaptive control value for each location.

In this case, in an embodiment, the step of providing the adaptive control value may include a step of providing, as the adaptive control value, an average pixel luminance weight WAPL for compensating for average pixel luminance APL for each location. The compensation weight W is generated by performing an operation on the adaptive control value and the IR drop weight WLIRC.

Furthermore, in another embodiment, the step of providing the adaptive control value may include a step of providing, as the adaptive control value, a value generated by performing an operation on the average pixel luminance weight WAPL and the display brightness value weight WDBV for each location. The compensation weight W may be generated by performing an operation on the adaptive control value and the IR drop weight WLIRC.

The compensation weight W generated as described above may be stored in the storage unit 60. The compensation weight W stored in the storage unit 60 may be provided to the display driving apparatus 120 of a display apparatus in which the display panel 100 is configured.

Figure 8:
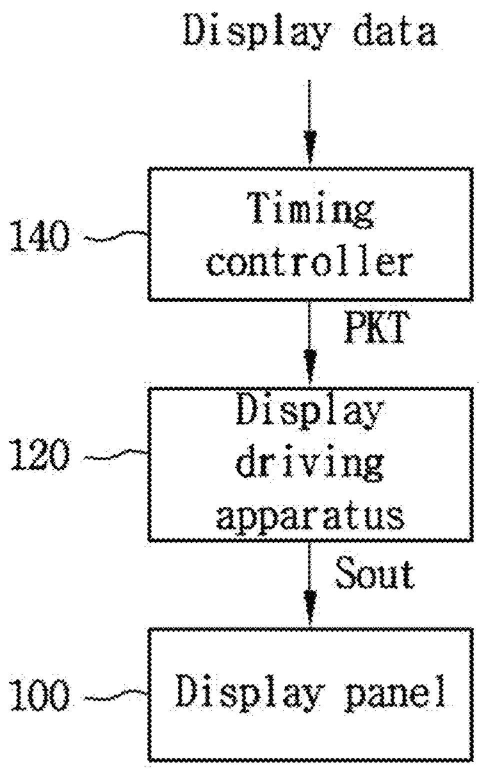
FIG. 8 is a block diagram illustrating an example of a display apparatus.

The display apparatus may be described with reference to FIG. 8.

The display apparatus may be configured to include the display panel 100, the display driving apparatus 120 and the timing controller 140.

The timing controller 140 receives display data provided by an external data source (not illustrated), configures a packet PKT for the display data, and provides the packet to the display driving apparatus 120.

After receiving the packet PKT, the display driving apparatus 120 is configured to restore the display data, generate a display signal Sout corresponding to the display data and provide the display signal Sout to the display panel 100.

Figure 9:
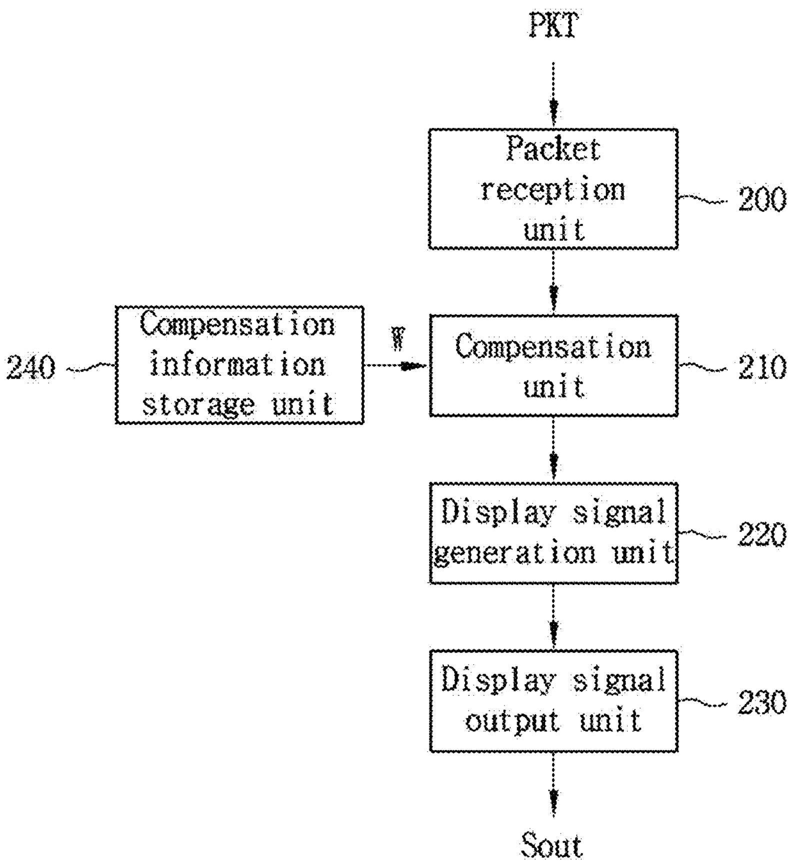
FIG. 9 is a block diagram illustrating an embodiment of a display driving apparatus in FIG. 8.

The display driving apparatus 120 may be configured as in FIG. 9, for example.

The display driving apparatus 120 may be configured to include a packet reception unit 200, a compensation unit 210, a display signal generation unit 220, a display signal output unit 230 and a compensation information storage unit 240.

The packet reception unit 200 functions to receive the packet PKT for the display data provided by the timing controller 140 and to restore the display data from the packet PKT.

The compensation unit 210 is configured to receive the display data and a compensation weight W. The compensation unit 210 is configured to perform compensations on display data displayed on the display panel 100 by using a weight generated by interpolation using compensation weights W for a plurality of locations adjacent to a display location of the display data and to output the compensated display data.

The compensation information storage unit 240 may store the compensation weight W generated by performing an operation on an IR drop weight WLIRC and an adaptive control value for each of pluralities of pre-designated locations of the display panel 100, and may provide the compensation weights W for a plurality of locations adjacent to a display location in response to a request from the compensation unit 210. The compensation information storage unit 240 may be configured using a memory such as a flash memory.

As described above, the IR drop weight WLIRC may be generated for each of pluralities of pre-designated locations in order to compensate for brightness values for all the pixels of the display panel 100 measured by using the brightness measuring unit 10.

Furthermore, an average pixel luminance weight WAPL and a display brightness value weight WDBV may be used as the adaptive control value. The adaptive control value may be understood with reference to the description given with reference to FIGS. 1 to 7, and thus a detailed description thereof is omitted.

A frame rate for displaying an image of a display panel may be variously selected. For example, the frame rate may be set to 120 Hz, 60 Hz, etc. Furthermore, the frame rate of the display panel may be fixed or changed depending on the use for a mobile device or a monitor.

A frame of an image is divided by a vertical sync signal. One cycle of the vertical sync signal may be understood as a vertical period in which one frame is displayed.

The vertical period may be divided into a vertical back porch period, a vertical active period and a vertical front porch period. The vertical back porch period corresponds to a given time from start timing of the vertical period. Furthermore, the vertical active period corresponds to a given time for displaying a frame after the vertical back porch period. The vertical active period may be understood as a period in which an image signal is outputted in synchronization with a display enable signal. Furthermore, the vertical front porch period corresponds to a period from end timing of the vertical active period to end timing of the vertical period.

An embodiment of the present disclosure may apply compensations to a display signal influenced by an IR drop that differently acts depending on locations of a display panel in the vertical back porch period and the vertical active period. That is, in an embodiment of the present disclosure, the compensation unit 210 may perform compensations on display data by using a weight generated by interpolation using compensation weights W for a plurality of locations in the vertical back porch period and the vertical active period.

The compensation unit 210 may receive a control signal (not illustrated) from the outside so that the vertical period can be divided into the vertical back porch period and the vertical active period for compensations for display data. The control signal may be generated based on a count result operating in conjunction with a vertical sync signal or a count result of a horizontal sync signal for identifying a horizontal cycle included in the vertical period and provided, and a detailed description and illustration thereof are omitted.

As described above, an embodiment of the present disclosure may apply compensations to a display signal in the vertical back porch period and the vertical active period, and may additionally perform the gating of a clock signal in the vertical front porch period in order to reduce power consumption.

For example, in a display apparatus supporting a seamless frequency change, a clock signal may be gated in the vertical front porch period of a vertical period divided by a vertical sync signal. The gating of the clock signal means that the clock signal is blocked from being provided to parts that belong to parts included in a display driving apparatus and require the clock signal. As described above, when the clock signal is gated, an unnecessary operation of parts operated by the clock signal and the unnecessary toggling of the clock signal can be prevented. As a result, there is an effect in that power consumption can be reduced.

The display signal generation unit 220 is configured to drive the display signal Sout in accordance with compensated display data. The display signal output unit 230 is configured to provide the display panel 100 with the display signal Sout driven by the display signal generation unit 220.

The present disclosure can solve a brightness difference between pixels, attributable to an IR drop that differently acts depending on locations of the display panel 100, by using the IR drop weight WLIRC. Accordingly, all the pixels of the display panel 100 can emit light with the same brightness based on the same gray. As a result, there is an effect in that a high-quality screen from which the influence of an IR drop has been removed can be displayed on the display panel 100.

Furthermore, the present disclosure can adaptively adjust a brightness difference between pixels, attributable to an IR drop that differently acts depending on locations of the display panel 100, by using the IR drop weight WLIRC. Accordingly, the present disclosure has effects in that brightness of all the pixels of the display panel 100 can be adjusted by taking into consideration average pixel luminance and a display brightness value and the influence of an IR drop can be removed.

What is claimed is:

1. A voltage drop compensation apparatus for a display panel, comprising:

a brightness measuring circuit configured to measure brightness of a display panel and to provide brightness values for all pixels;

a voltage drop weight generation circuit configured to generate a voltage drop weight for compensating for the brightness values for each location of a plurality of pre-designated locations; and an adaptive controller configured to provide an adaptive control value for each location for controlling the brightness values for each location and to generate a compensation weight by performing an operation on the voltage drop weight and the adaptive control value for each location, wherein the adaptive controller comprises, the average pixel luminance weight generation circuit configured to generate an average pixel luminance weight for compensating for average pixel luminance by using the brightness values for each location; and an operation circuit configured to use the average pixel luminance weight as the adaptive control value and generate the compensation weight by performing an operation on the adaptive control value and the voltage drop weight for each location.

2. The voltage drop compensation apparatus of claim 1, wherein the voltage drop weight generation circuit generates the voltage drop weight based on a lowest brightness value among the brightness values of the plurality of locations.

3. The voltage drop compensation apparatus of claim 2, wherein the voltage drop weight generation circuit generates the voltage drop weight that lowers a brightness value of the corresponding location.

4. The voltage drop compensation apparatus of claim 1, wherein the voltage drop weight generation circuit includes a white mode value and generates the voltage drop weight by applying the same white mode value to pixels of all colors in a white mode.

5. The voltage drop compensation apparatus of claim 1, wherein the voltage drop weight generation circuit comprises a different color mode value for each color and generates the voltage drop weight by applying a color mode value of a corresponding color for each location in a color mode.

6. The voltage drop compensation apparatus of claim 1, wherein the average pixel luminance weight generation circuit divides a range of the average pixel luminance into a plurality of subranges and generates the average pixel luminance weight having a different value for each subrange.

7. The voltage drop compensation apparatus of claim 6, wherein:

the average pixel luminance weight generation circuit divides the range of the average pixel luminance into a first subrange, a second subrange and a third subrange by using a first luminance reference value and a second luminance reference value, the second luminance reference value has a higher luminance value than the first luminance reference value, a first average pixel luminance weight which is pre-designated is used as the average pixel luminance weight in the first subrange equal to or lower than the first luminance reference value, a second average pixel luminance weight which is pre-designated and higher than the first average pixel luminance weight is used as the average pixel luminance weight in the second subrange equal to or higher than the second luminance reference value, and a third average pixel luminance weight having a value proportional to an increase in the average pixel luminance is used as the average pixel luminance weight in the third subrange between the first luminance reference value and the second luminance reference value.

8. The voltage drop compensation apparatus of claim 7, wherein:

in the third subrange, the third average pixel luminance weight includes a value increasing $2^n$ times proportional to the increase in the average pixel luminance, and n is a natural number equal to or greater than 1.

9. The voltage drop compensation apparatus of claim 1, wherein:

the adaptive controller further comprises a display brightness value weight provision circuit configured to provide a display brightness value weight, the operation circuit uses, as the adaptive control value, a value generated by performing an operation on the display brightness value weight and the average pixel luminance weight for each location and generates the compensation weight by performing an operation on the adaptive control value and the voltage drop weight for each location, a display brightness value weight set corresponds to a preset display luminance reference value, and comprises a plurality of display brightness value weights having different values for each of a plurality of regions in which the display panel is divided in units of a plurality of horizontal lines, and, the display brightness value weight provision circuit provides the display brightness value weight corresponding to the location.

10. A voltage drop compensation method for a display panel, comprising:

providing brightness values for all pixels of a display panel measured by using a brightness measuring circuit;

generating a voltage drop weight for compensating for the brightness values for each location of a plurality of pre-designated locations;

providing an adaptive control value for controlling a brightness value for each location; and generating a compensation weight by performing an operation on the voltage drop weight and the adaptive control value for each location, wherein the providing of the adaptive control value comprises providing, as the adaptive control value, an average pixel luminance weight for compensating for average pixel luminance for each location, and wherein the compensation weight is generated by performing an operation on the adaptive control value and the voltage drop weight.

11. The voltage drop compensation method of claim 10, wherein the voltage drop weight is generated based on a lowest brightness value of the brightness values of the plurality of locations.

12. The voltage drop compensation method of claim 10, wherein the voltage drop weight is generated by applying an identical white mode value to pixels of all colors in a white mode, and is generated by applying different color mode values to the pixels in a color mode.

13. The voltage drop compensation method of claim 10, wherein the average pixel luminance weight is generated to have a different value for each of subranges in a range of the average pixel luminance divided into a plurality of subranges.

14. The voltage drop compensation method of claim 13, wherein:

the subranges are divided into a first subrange equal to or lower than a first luminance reference value, a second subrange equal to or higher than a second luminance reference value, and a third subrange between the first luminance reference value and the second luminance reference value, the second luminance reference value has a higher luminance value than the first luminance reference value, a first average pixel luminance weight pre-designated in accordance with the average pixel luminance in the first subrange is used as the average pixel luminance weight, a second average pixel luminance weight pre-designated in accordance with the average pixel luminance in the second subrange is used as the average pixel luminance weight, and a third average pixel luminance weight having a value proportional to an increase in the average pixel luminance in the third subrange is used as the average pixel luminance weight.

15. The voltage drop compensation method of claim 10, wherein:

the providing of the adaptive control value comprises providing, as the adaptive control value, a value generated by performing an operation on the average pixel luminance weight and a display brightness value weight for each location, a display brightness value weight set is set to correspond to a preset display luminance reference value, and comprises a plurality of display brightness value weights having different values for each of a plurality of regions in which the display panel is divided in units of a plurality of horizontal lines, and the display brightness value weight corresponding to each location is used to calculate the adaptive control value.

16. A display driving apparatus having a voltage drop compensation function, comprising:

a compensation information storage device configured to store compensation weights generated by performing an operation on a voltage drop weight and an adaptive control value for each of a plurality of pre-designated locations of a display panel; and a compensation circuit configured to receive display data and the compensation weights, compensate the display data by using a weight generated by interpolation using the compensation weights for a plurality of locations adjacent to a display location of the display data, and output the compensated display data, wherein the voltage drop weight is generated for each location of the plurality of pre-designated location to compensate for brightness values for all pixels of the display panel measured using a brightness measured circuit, and wherein an average pixel luminance weight for compensating for average pixel luminance for each location is used as the adaptive control value.

17. The display driving apparatus of claim 16, wherein the average pixel luminance weight is provided to have a different value for each of subranges in a range of the average pixel luminance divided into a plurality of subranges.

18. The display driving apparatus of claim 17, wherein:

a value generated by performing an operation on the average pixel luminance weight and a display brightness value weight is used as the adaptive control value, a display brightness value weight set is set to correspond to a preset display luminance reference value, and comprises a plurality of display brightness value weights having different values for each of a plurality of regions in which the display panel is divided in units of a plurality of horizontal lines, and the display brightness value weight corresponding to the location is used to calculate the adaptive control value.

19. The display driving apparatus of claim 16, wherein the compensation circuit performs compensations on the display data by using the weight generated by interpolation using the compensation weights in a vertical back porch period and vertical active period of a vertical period having one cycle divided by a vertical sync signal.

* * * * *